(12) United States Patent
Arndt et al.

(10) Patent No.: US 7,743,140 B2
(45) Date of Patent: Jun. 22, 2010

(54) BINDING PROCESSES IN A NON-UNIFORM MEMORY ACCESS SYSTEM

(75) Inventors: Barry Bradley Arndt, Round Rock, TX (US); Kevin Michael Corry, Pflugerville, TX (US); Mark Alan Peloquin, Austin, TX (US); Steven Pratt, Leander, TX (US); Santhosh Rao, Austin, TX (US); Karl Milton Rister, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 11/608,301

(22) Filed: Dec. 8, 2006

(65) Prior Publication Data

US 2008/0141251 A1 Jun. 12, 2008

(51) Int. Cl.
*G06F 15/173* (2006.01)
*G06F 13/00* (2006.01)

(52) U.S. Cl. .................. 709/224; 719/317; 719/331

(58) Field of Classification Search ......... 709/200–230; 711/171; 714/43; 716/12; 717/102; 719/330; 370/360

See application file for complete search history.

(56) References Cited

U.S. PATENT DOCUMENTS

| | | | |
|---|---|---|---|
| 5,960,170 A * | 9/1999 | Chen et al. ............... 714/38 |
| 6,996,630 B1 | 2/2006 | Masaki et al. |
| 7,028,313 B2 * | 4/2006 | Gooding .................. 719/330 |
| 7,058,783 B2 * | 6/2006 | Chandrasekaran et al. .. 711/171 |
| 7,137,124 B2 * | 11/2006 | Lamb et al. ............... 719/321 |
| 7,317,718 B1 * | 1/2008 | Kuo et al. .................. 370/360 |
| 7,370,239 B2 * | 5/2008 | Apel et al. .................. 714/43 |
| 2003/0126200 A1 | 7/2003 | Wolff |
| 2003/0149795 A1 * | 8/2003 | Lamb et al. ................ 709/250 |
| 2005/0114739 A1 | 5/2005 | Gupta et al. |
| 2005/0283753 A1 * | 12/2005 | Ho et al. .................... 717/102 |
| 2006/0062150 A1 | 3/2006 | Felter et al. |
| 2006/0129654 A1 * | 6/2006 | Sato ......................... 709/213 |
| 2006/0253526 A1 * | 11/2006 | Welch et al. ............... 709/200 |
| 2007/0088842 A1 * | 4/2007 | Mandal et al. ............. 709/230 |
| 2007/0118630 A1 * | 5/2007 | Hashimoto et al. ........ 709/223 |
| 2007/0198553 A1 * | 8/2007 | Wolman .................... 707/100 |
| 2007/0294656 A1 * | 12/2007 | Bowen ....................... 716/12 |
| 2008/0082665 A1 * | 4/2008 | Dague et al. ............... 709/226 |
| 2009/0198765 A1 * | 8/2009 | Stamos et al. .............. 709/202 |
| 2009/0254924 A1 * | 10/2009 | Anirudh et al. ............ 719/321 |
| 2009/0254972 A1 * | 10/2009 | Huang et al. .................. 726/1 |

* cited by examiner

*Primary Examiner*—Bunjob Jaroenchonwanit
(74) *Attorney, Agent, or Firm*—Yee & Associates, P.C.; Steven L. Bennett

(57) ABSTRACT

A computer implemented method, apparatus, and computer usable program product for binding a process to a selected node of a multi-node system. Input/output activity statistics for a process are retrieved from a set of probes. The set of probes detects a flow of data through an input/output device utilized by the process. A topology of the multi-node system that comprises a location of the input/output device is identified. A node is selected according to a decision policy to form a selected node. The process is bound to the selected node according to the decision policy.

10 Claims, 3 Drawing Sheets

BINDING PROCESSES IN A NON-UNIFORM MEMORY ACCESS SYSTEM

BACKGROUND OF THE INVENTION

1. Field of the Invention

The present invention relates generally to an improved data processing system and in particular to a non-uniform memory access system. More particularly, the present invention is directed to a computer implemented method, apparatus, and computer usable program product for binding a process to a selected node in a non-uniform memory access system.

2. Description of the Related Art

Many computer systems today have multiple nodes. A multi-node system is often referred to as a non-uniform memory access system because memory access across nodes is slower than the access of memory within a node. A node is a block of memory with each byte the same distance from the central processing unit and any system component, such as a central processing unit, input/output (I/O) device, or any other known or available component that is physically located on the same bus as the memory. The nodes of a non-uniform memory access system are generally connected by an internode bus, which is a high speed or high bandwidth bus connection that enables the transfer of data from one node to another. The separate nodes of the non-uniform memory access system operate together to run a single instance of an operating system.

Problems may arise when a process generating or requiring substantial amounts of input/output data is initiated on one node, referred to as the local node, but the input/output adapter through which the input/output data passes, or from which the input/output data is generated, is located in a second node. The second node is referred to as a remote node. This movement of input/output data through a non-uniform memory access system is referred to as input/output traffic. As the amount of input/output traffic passing through the internode bus increases, data transfer latency may occur. The increase in traffic across the bus consumes central processing unit resources which decreases processor efficiency.

For example, an application for watching streaming video from the Internet is initiated on the local node. However, the input/output adapter, which is a network card in this illustrative example, is located on a remote node. To run the streaming video application, data received from the network card of the remote node must be transmitted to the local node via the internode bus for processing. A single instance of a process of a local node requiring input/output data from an input/output adapter of a remote node may not result in substantial latency across the internode bus. However, in many instances, numerous processes are run from the numerous local nodes, all of which are requiring input/output data from remote nodes. Thus, the movement of input/output traffic through the internode bus increases exponentially thereby increasing the latency in the transmission of data over the internode bus.

Currently, non-uniform memory access systems processing heavy input/output traffic have duplicate adapters in each node and use multipathing to select the input/output adapter in the local node to generate the input/output data. Multipathing is a method in which an operating system selects a physical path from a set of paths between a process and a component, such as an input/output device utilized by the process. This solution, however, is inefficient because it requires redundant components in each of the nodes. Furthermore, many non-uniform memory access system users fail to configure their systems to operate with the multipath function. Moreover, not all drivers and operating systems fully support multipathing.

Another current solution to the problem is manually assigning a process to a node containing the input/output adapter generating the input/output data. Assigning a process to a node consists of specifying which node or nodes of the non-uniform memory access system are capable of running a particular process. However, once a process is assigned to a node, the process must be run from that node or nodes until the process is reassigned to a different node. The process must run from the assigned node despite the fact that there may be a different node better suited to run that particular process. Consequently, a user is required to spend significant amounts of time micromanaging the assignment and reassignment of numerous processes of a non-uniform access system to various nodes.

As described above, the current solutions for optimally running processes in a non-uniform memory access system can be inefficient, as in the instance where a user is required to manually assign processes to certain nodes within a non-uniform memory access system. In other instances, current solutions may be difficult for users to implement, if the solutions can be implemented at all.

SUMMARY OF THE INVENTION

The illustrative embodiments described herein provide a computer implemented method, apparatus, and computer usable program product for binding a process to a selected node of a multi-node system. Input/output activity statistics for a process are retrieved from a set of probes. The set of probes detects a flow of data through an input/output device utilized by the process. A topology of the multi-node system that comprises a location of the input/output device is identified. A node is selected according to a decision policy to form a selected node. The process is bound to the selected node according to the decision policy.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
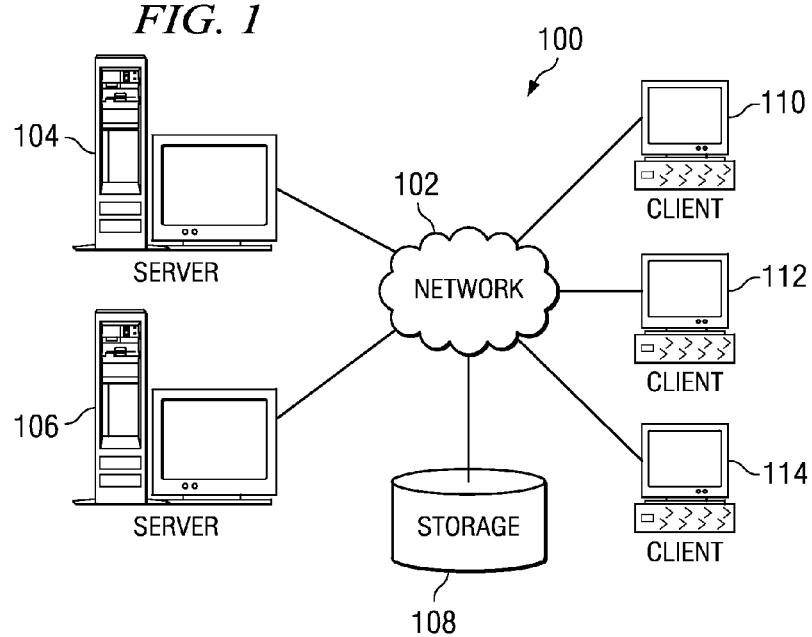
FIG. 1 is a pictorial representation of a network of data processing systems in which illustrative embodiments may be implemented.
Figure 2:
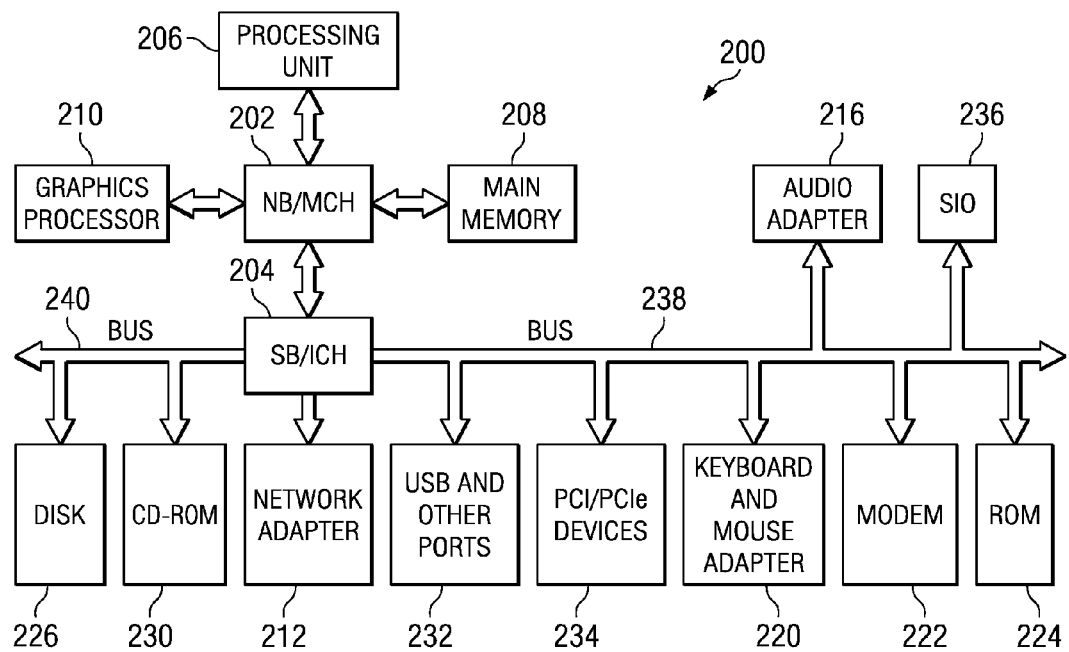
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computing devices in which embodiments may be implemented. Network data processing system 100 contains network 102, which is the medium used to provide communication links between various devices and computers connected together within network data processing system 100. Network 102 may include connections, such as wire, wireless communication links, or fiber optic cables. The depicted example in FIG. 1 is not meant to imply architectural limitations. For example, data processing system 100 also may be a network of telephone subscribers and users.

In the depicted example, server 104 and server 106 connect to network 102 along with storage unit 108. In addition, clients 110, 112, and 114 are coupled to network 102. These clients 110, 112, and 114 may be, for example, personal computers or network computers. In addition, clients 110, 112, and 114 may also be, for example, non-uniform memory access systems. In the depicted example, server 104 provides data, such as boot files, operating system images, and applications, to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), a wide area network (WAN), a telephone network, or a satellite network. FIG. 1 is intended as an example, and not as an architectural limitation for different embodiments.

With reference now to FIG. 2, a block diagram of a data processing system is shown in which illustrative embodiments may be implemented. Data processing system 200 is an example of a computing device, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object-oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an input/output bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and the above-described examples are not meant to imply architectural limitations. For example, data processing system 200 also may be a tablet computer or a laptop computer in addition to taking the form of a PDA.

The illustrative embodiments described herein provide a computer implemented method, apparatus, and computer usable program product for binding a process to a selected node of a multi-node system. Input/output activity statistics for a process are retrieved from a set of probes. The set of probes detects a flow of data through an input/output device utilized by the process. A topology of the multi-node system that comprises a location of the input/output device is identified. A node is selected according to a decision policy to form a selected node. The process is bound to the selected node according to the decision policy.

A selected node is a node in a non-uniform memory access system as identified by a non-uniform memory access daemon in accordance with a decision policy. A selected node is a node from which a process may be optimally run so that the sum of all input/output traffic across the internode bus is minimized, or so that the efficiency of executing processes in the various nodes is optimized.

A decision policy is a set of rules or instructions that defines a selected node. A non-uniform memory access daemon references or accesses the decision policy to select a node for purposes of binding a process to the selected node. In one embodiment, the decision policy defines a selected node, in part, based upon a rate of the flow of input/output traffic generated by the process. Thus, the decision policy may require that, for a process requiring input/output data generated by an input/output adapter at a remote node, the remote node is the selected node if the rate of input/output traffic generated by the input/output adapter exceeds a threshold amount. The non-uniform memory access daemon then selects a node according to the decision policy once the non-uniform memory access system collects or receives information identifying the local node on which a process is running, the remote node of the input/output adapter, and the rate of flow of input/output traffic between the two nodes.

In addition, the decision policy may define a selected node, in part, based upon a distribution of processor utilization across the multi-node system. In other words, the decision policy may define a selected node based upon a determination that a central processing unit of a remote node is running fewer processes and is better suited for handling a process generated on a local node. Referring to the decision policy, the non-uniform memory access daemon may then select a node according to the decision policy once the non-uniform memory access daemon collects or receives information identifying the different processes running on the various nodes of the non-uniform memory access system.

For example, in one embodiment, the decision policy defines a selected node as the node of a non-uniform memory access system from which a threshold amount of input/output traffic is generated for a given process. Thus, a process for viewing a streaming video that is initiated on a first node may require input/output data from an input/output device, such as a network card that is located on a second node. If the amount of input/output traffic required by the process for viewing a streaming video exceeds a threshold amount, then the decision policy may define the selected node as the second node on which the network card is located.

Once the selected node has been identified, the non-uniform memory access daemon binds the process to the selected node according to the decision policy. A non-uniform memory access daemon may bind a process to a selected node by loading and executing a process code in the selected node. In addition, binding a process to a selected node may also comprise migrating a memory associated with the process to the selected node. Migrating a memory associated with the process may be the movement of data stored in the memory of a node to the memory of the selected node on which the process is running. In this manner, both the process and the data utilized by the process are stored in the same memory of the selected node. Consequently, the process may access necessary data more efficiently.

The non-uniform memory access daemon will bind the process to the selected node according to the decision policy. Thus, the non-uniform memory access daemon will either bind just the process to the selected node by loading and executing the process in the selected node, or will also migrate a memory associated with the process as required by the decision policy. The criteria for determining whether the memory associated with the process is also to be migrated to the selected node may be selected by a user. The criteria may be based upon, for example, the type of process requiring the data or the type of data required by the process.

A non-uniform memory access daemon is a software component that runs in the background of a non-uniform access system, rather than under the direct control of a user. Non-uniform memory access daemons are typically initiated as processes that trigger specified actions when certain input is received. A process is a software program or part of a software program or other computing operation that performs a single task. On Microsoft™ Windows® systems, programs called "services" perform the functions of daemons. In an illustrative embodiment, the non-uniform memory access daemon works in conjunction with a set of system probes to detect the input/output traffic of a process to identify a selected node.

As used herein, the term "set of probes" refers to one or more probes. A probe is a software component insertable in an operating system kernel space or the various input/output layers of a non-uniform access system through which input/output traffic passes. The set of probes are operable for observing system behavior and gathering input/output activity statistics relating to the input/output traffic. Input/output activity statistics include information such as, for example, when input/output traffic is generated, the identity of processes generating or requesting the input/output traffic, the various pathways through which the input/output traffic passes, and the amount of input/output traffic that has been generated. Examples of system probes may include System Tap® or DTrace®.

System topology is the basic configuration and layout of components in the non-uniform memory access system, such as the location of input/output adapters, central processing units, and memory. In addition to receiving or collecting information about the system topology of a non-uniform memory access system, the process of identifying a system topology also includes receiving or collecting information about the nodes on which current processes are located, the number of processes running on each node, or any other similar information describing the processes that are being executed on the non-uniform memory access system. The non-uniform memory access daemon reviews the system topology and the input/output activity profile in light of a predefined decision policy to identify a selected node.

Figure 3:
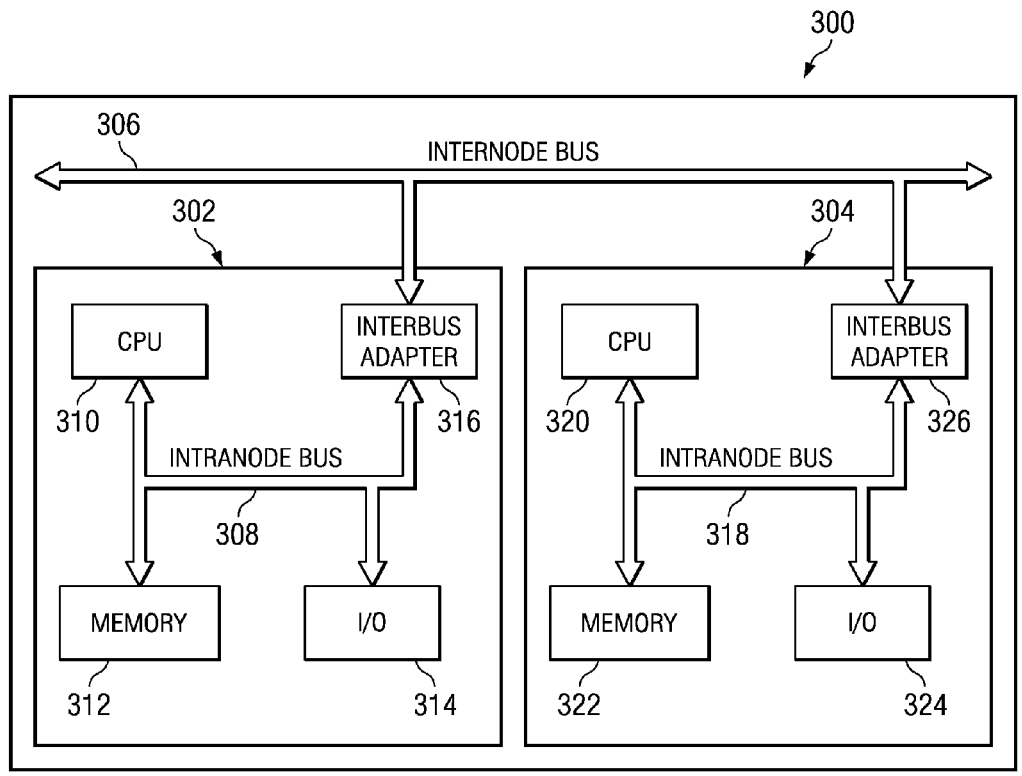
FIG. 3 is a block diagram of a data flow for binding a process to a selected node in accordance with an illustrative embodiment.

Referring now to FIG. 3, a block diagram depicting a data flow in a system for binding a process to a selected node is depicted in accordance with an illustrative embodiment. Non-uniform memory access system 300 is a data processing system such as data processing system 200 in FIG. 2, and clients 110, 112, and 114 of FIG. 1.

Non-uniform memory access system 300 comprises node 302 and node 304. Node 302 is coupled to node 304 via internode bus 306. Node 302 and node 304 each comprise various system components connected to an intranode bus. For instance, in this illustrative embodiment, node 302 comprises intranode bus 308 to which CPU 310, memory 312, and I/O 314 are coupled. I/O 314 may be any input/output device known or available which is capable of generating or transmitting input/output data. For example, I/O 314 may be a network card, a keyboard, a joystick, or a monitor. Although not depicted, other known or available system components may be coupled to intranode bus 308.

Intranode bus 308 is coupled to internode bus 306 at interbus adapter 316. Interbus adapter 316 is a device for interfacing between two different busses, such as internode bus 306 and intranode bus 308. Similar to node 302, node 304 comprises intranode bus 318 that is coupled to CPU 320, memory 322, and I/O 324. Intranode bus 318 is coupled to internode bus 306 at interbus adapter 326. As with node 302, node 304 may also comprise other known or available system components.

The combination of internode and intranode busses and interface adapters of non-uniform memory access system 300 serves as the data pathway through which input/output traffic passes in order to move from one node to another. For example, a process initiated on memory 312 of node 302 may require input/output data generated at I/O 324. The input/output data generated at I/O 324 is transferred to memory 312 of node 302 by first passing from intranode bus 318 to internode bus 306 via interbus adapter 326. The input/output data then passes from internode bus 306 to intranode bus 308 via interbus adapter 316. From intranode bus 308, the input/output data is passed into memory 312 for utilization by the process running in memory 312.

From the perspective of non-uniform memory access system 300, the distinct blocks of memory within nodes 302 and 304 of non-uniform memory access system 300 may be viewed as a logically contiguous memory region. For example, although memory 312 and memory 322 are distinct blocks of memory located in different nodes, memory 312 and memory 322 may be viewed as a logically contiguous memory region, which may be represented, for example, as memory 400 of FIG. 4.

Figure 4:
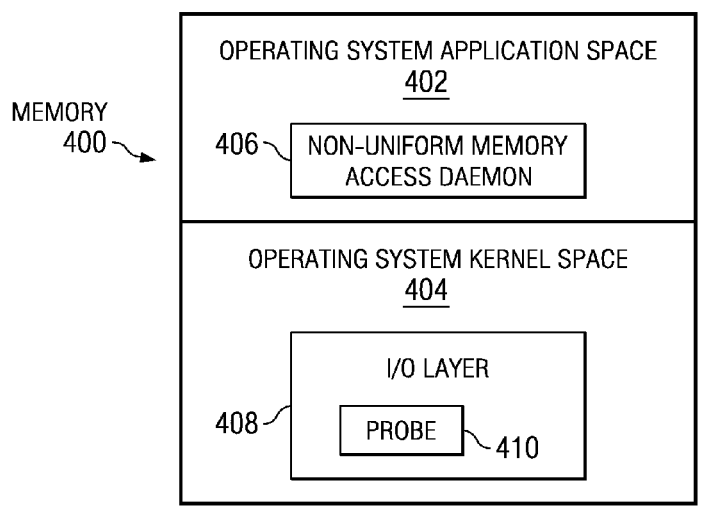
FIG. 4 is a block diagram of a logical representation of a memory in a non-uniform memory access system in accordance with an illustrative embodiment.

Referring now to FIG. 4, a block diagram of a logical representation of the memory of a non-uniform memory access system is depicted in accordance with an illustrative embodiment. Memory 400 is a logically contiguous memory region representing the combination of all memory blocks of a non-uniform memory access system.

Memory 400 is subdivided into operating system application space 402 and operating system kernel space 404. Operating system application space 402 contains non-uniform memory access daemon 406. Operating system kernel space 404 contains various subsystems such as I/O layer 408 within which probe 410 resides after insertion. Probe 410 is a set of probes as defined above.

In an illustrative embodiment, when non-uniform memory access daemon 406 is initiated in a non-uniform memory access system, such as non-uniform memory access system 300 of FIG. 3, non-uniform memory access daemon 406 inserts probe 410 into I/O layer 408 to detect input/output traffic.

Once inserted into I/O layer 408 of operating system kernel space 404, probe 410 may detect and monitor input/output activity occurring in a corresponding input/output path. An input/output path is a path between two endpoints, a first endpoint, for example, being a computer application and a second endpoint being the input/output adapter. For example, input/output activity originating from an input/output adapter, such as I/O 324 of FIG. 3, may be detected by probe 410 inserted into I/O layer 408. Probe 410 may detect input/output activity generated by I/O 324 as the input/output traffic passes through the input/output path monitored by probe 410.

Once input/output activity is detected, probe 410 collects input/output activity statistics. As provided above, the input/output activity statistics can include, for example, when input/output traffic is generated, the identity of processes generating or requesting the input/output traffic, the various pathways through which the input/output traffic passes, and the amount of input/output traffic that has been generated.

Non-uniform memory access daemon 406 then retrieves from probe 410 the input/output activity statistics and forms an input/output activity profile embodying the input/output activity statistics. The input/output activity statistics may be retrieved at predetermined periodic intervals, or may be based on the occurrence of non-periodic events. Non-periodic events may include, for example, a specific user request, when new processes are initiated, or when the non-uniform memory access system detects a certain threshold of input/output traffic latency.

Non-uniform memory access daemon 406 identifies a topology of the non-uniform access system either before or after non-uniform memory access daemon 406 retrieves the input/output activity statistics from probe 410. The topology may be identified by executing a software code of non-uniform memory access daemon 406 that calls one or more application program interfaces of an operating system which retrieves the non-uniform memory access system topology for non-uniform memory access daemon 406. As provided above, the system topology can include, for example, the location of input/output adapters, central processing units, and memory within the non-uniform memory access system, and identifies information about the nodes on which current processes are located, the number of processes running on each node, or any other similar information describing the processes that are being executed on the non-uniform memory access system. Once non-uniform memory access daemon 406 has both the input/output activity profile and the identification of the non-uniform memory access system's topology, non-uniform memory access daemon 406 identifies those processes that are candidates for migration, and selects a node for each process that is a candidate for migration according to the decision policy.

A process may be a candidate for migration if, for example, non-uniform memory access daemon 406 determines that an input/output device on a second node is generating a threshold amount of input/output traffic required by a process located on a first node. Furthermore, a process may be excluded from migration even if a threshold amount of input/output traffic is generated, if, for example, non-uniform memory access daemon 406 determines that adding another process to the selected node would violate a rule governing the total number of processes that any given node may maintain.

For each process that is a candidate for migration, non-uniform memory access daemon 406 identifies a selected node in accordance with a decision policy. If the selected node is the local node, then the process is allowed to remain on the local node. However, if the selected node is a remote node, then non-uniform memory access daemon 406 binds the process to the selected node.

An example to further illustrate the operation of memory 400 of FIG. 4 within a non-uniform memory access system, such as non-uniform memory access system 300 of FIG. 3, may be described with respect to the process for viewing a streaming video utilizing a network card coupled to the Internet. Upon startup, a non-uniform memory access system initiates a non-uniform memory access daemon, such as non-uniform memory access daemon 406 of FIG. 4. The non-uniform memory access daemon is initiated in an operating system application space, such as operating system application space 402 of FIG. 4. In this illustrative embodiment, a non-uniform memory access daemon inserts a set of probes, such as probe 410 of FIG. 4, into an input/output layer of an operating system kernel space, such as I/O layer 408 of operating system kernel space 404 of FIG. 4. The set of probes monitors input/output activity traveling through a corresponding input/output path.

When the streaming video process is initiated on a local node of a non-uniform memory access system, such as node 302 of FIG. 3, the set of probes, in conjunction or individually, collects the input/output activity statistics generated by the network card of a remote node, such as node 304 of FIG. 3. The collected input/output activity statistics may include, for example, the identity and location of the streaming video process requiring input/output data, the identity and location of the network card generating the input/output data, and the rate of input/output traffic traveling through the internode bus, such as internode bus 306 of FIG. 3. In this manner, the non-uniform memory access daemon may retrieve the input/output activity statistics from the set of probes in order to generate an input/output activity profile. The non-uniform memory access daemon then references the input/output activity profile in light of the decision policy in order to identify a selected node.

For example, upon retrieving the input/output activity statistics from the set of probes relating to the streaming video process, the non-uniform memory access daemon creates an input/output activity profile, and also identifies the most current information regarding the non-uniform memory access system's topology. Thereafter, the non-uniform memory access daemon references a decision policy to identify a selected node and to determine whether the streaming video process is a candidate for migration to the selected node.

In this example, if the non-uniform memory access daemon determines that the amount of input/output traffic generated at the network card of the remote node exceeds a threshold amount, then the non-uniform memory access daemon identifies the remote node as the selected node. The non-uniform memory access daemon can determine the amount of input/output traffic by referencing the input/output activity profile based upon the input/output activity statistics collected by the set of probes. If the process for viewing streaming video is a candidate for migration, then the non-uniform memory access daemon binds the process to the selected node. Otherwise, if the non-uniform memory access daemon either determines that the local node is the selected node or that the process is not a candidate for migration, then the streaming video process remains on the local node.

Figure 5:
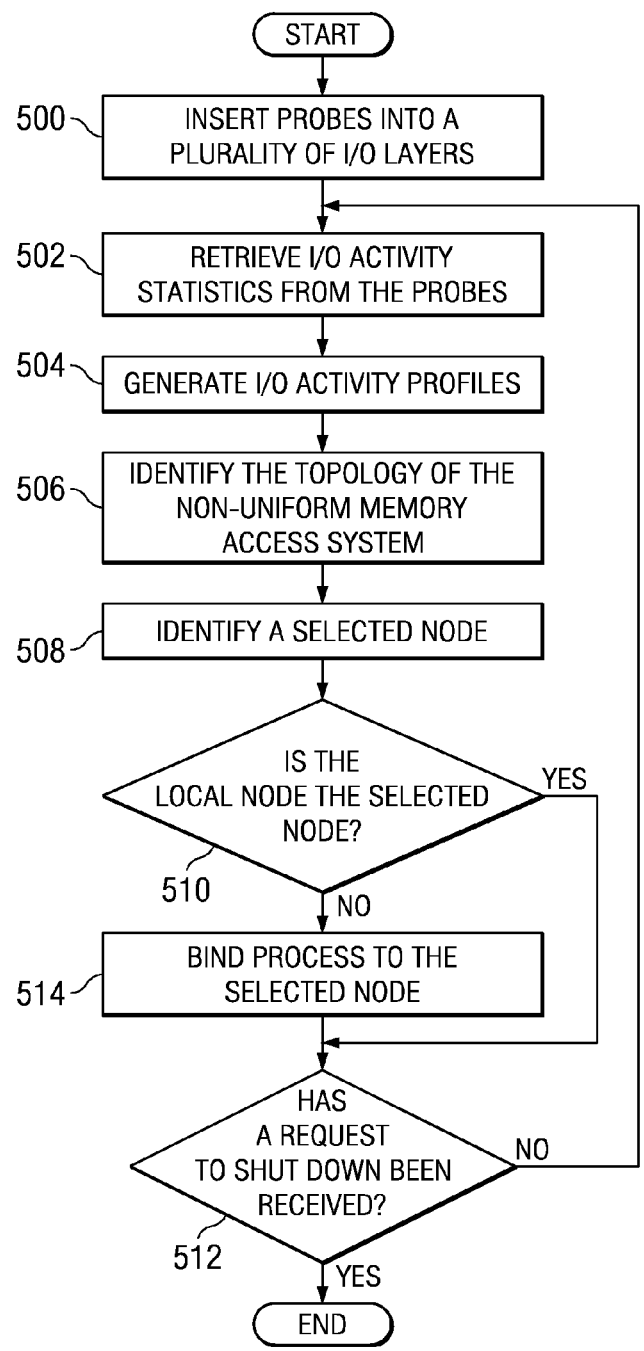
FIG. 5 is a flowchart of a process for binding a process to a selected node in accordance with an illustrative embodiment.

Referring now to FIG. 5, a flowchart of a process for binding a process to a selected node is depicted in accordance with an illustrative embodiment. In the example as depicted in FIG. 4, the binding is performed by a software component, such as non-uniform memory access daemon 406 in FIG. 4.

When the non-uniform memory access daemon is initiated, the non-uniform memory access daemon inserts a set of probes into a plurality of input/output (I/O) layers (step 500). The non-uniform memory access daemon then retrieves input/output activity statistics from the set of probes (step 502). Using the input/output activity statistics retrieved from the set of probes, the non-uniform memory access daemon generates input/output activity profiles (step 504). Thereafter, the non-uniform memory access daemon identifies the topology of the non-uniform memory access system (step 506). Using the input/output activity profiles and the topology of the non-uniform memory access system, the non-uniform memory access daemon identifies a selected node in accordance with a decision policy (step 508).

The non-uniform memory access daemon then makes a determination as to whether the local node is the selected node (step 510). If the non-uniform memory access daemon determines that the selected node is the local node, then the non-uniform memory access daemon makes the determination as to whether a request to shut down has been received (step 512). If the non-uniform memory access daemon has received a request to shut down, then the process terminates thereafter. If the non-uniform memory access daemon has not received a request to shut down, then the process returns to step 502.

Returning now to step 510, if the non-uniform memory access daemon makes the determination that the local node is not the selected node, then the non-uniform memory access daemon binds the process to the selected node (step 514), and the process continues to step 512.

Figure 6:
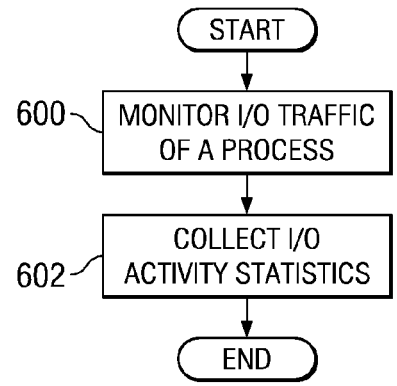
FIG. 6 is a flowchart of a process for retrieving input/output activity statistics in accordance with an illustrative embodiment.

Referring now to FIG. 6, a flowchart for collecting input/output activity statistics is depicted in accordance with an illustrative embodiment. In this example as shown in FIG. 6, the collecting of input/output activity statistics is performed by a set of probes, such as probe 410 of FIG. 4.

A set of probes monitors input/output traffic of a process (step 600). Thereafter, the set of probes collects the input/output activity statistics (step 602), and the process terminates thereafter.

The illustrative embodiments described herein provide a computer implemented method, apparatus, and computer usable program product for binding a process to a selected node of a multi-node system. Input/output activity statistics for a process are retrieved from a set of probes. The set of probes detects a flow of data through an input/output device utilized by the process. A topology of the multi-node system that comprises a location of the input/output device is identified. A node is selected according to a decision policy to form a selected node. The process is bound to the selected node according to the decision policy.

Thus, the illustrative embodiments provide a computer implemented method, apparatus, and computer usable program code for facilitating the binding of a process to a selected node. A non-uniform memory access system automatically detects input/output activity and binds a process to the selected node in accordance with a predefined decision policy. Binding processes to selected nodes decreases system input/output traffic and, as a result, increases the availability of system resources. In addition, the illustrative embodiments obviate the need for a user of a non-uniform memory access system to search out every process generating input/output traffic and bind it to a particular node that may or may not be the optimal node to host the process.

The flowchart and block diagrams in the figures illustrate the architecture, functionality, and operation of some possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output devices (including but not limited to keyboards, displays, pointing devices, etc.) can be coupled to the system either directly or through intervening input/output controllers.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for binding a process to a selected node in a multi-node system, the method comprising:
   a plurality of steps performed by a non-uniform memory access daemon executed by a processor in a computer, the plurality of steps comprising:
   retrieving input/output activity statistics for the process from a set of probes, wherein the set of probes detects a flow of data through an input/output device utilized by the process;
   identifying a topology of the multi-node system, wherein the topology comprises a location of the input/output device;
   selecting a node according to a decision policy to form the selected node, wherein the non-uniform memory access daemon uses the input/output activity statistics of the process and the topology of the multi-node system to identify the selected node that adheres to the decision, wherein the decision policy provides rules that define the selected node for binding the process to the selected node based on a rate of the flow of data generated by the process and based on a distribution of processor utilization across the multi-node system; and
   binding the process to the selected node according to the decision policy by loading and executing the process in the selected node.

2. The computer implemented method of claim 1, wherein the step of binding the process to the selected node further comprises:
   migrating a memory associated with the process to the selected node.

3. The computer implemented method of claim 1 wherein the input/output activity statistics are retrieved at periodic intervals.

4. The computer implemented method of claim 1 wherein the set of probes is implemented in an operating system kernel space.

5. The computer implemented method of claim 1 wherein the set of probes is implemented in an input/output layer.

6. A computer usable program product for binding a process to a selected node of a multi-node system, the computer usable program product comprising:
   a computer readable storage medium having computer usable program code tangibly embodied thereon;
   the computer usable program code configured to cause a processor to execute the computer usable program code comprising:
   computer usable program code for retrieving input/output activity statistics for the process from a set of probes, wherein the set of probes detects a flow of data through an input/output device utilized by the process;
   computer usable program code for identifying a topology of the multi-node system, wherein the topology comprises a location of the input/output device;
   computer usable program code for selecting a node according to a decision policy to form the selected node, wherein the non-uniform memory access daemon uses the input/output activity statistics of the process and the topology of the multi-node system to identify the selected node that adheres to the decision policy, wherein the decision policy provides rules that define the selected node for binding the process to the selected node based on a rate of the flow of data generated by the process and based on a distribution of processor utilization across the multi-node system; and
   computer usable program code for binding the process to the selected node according to the decision policy by loading and executing the process in the selected node.

7. The computer usable program product of claim 6, further comprising:
   computer usable program code for migrating a memory associated with the process to the selected node.

8. The computer usable program product of claim 6, further comprising computer usable program code for retrieving the input/output activity statistics at periodic intervals.

9. The computer usable program product of claim 6, further comprising:
   computer usable program code for inserting the set of probes into an operating system kernel space.

10. The computer usable program product of claim 6, further comprising:
    computer usable program code for inserting the set of probes into an input/output layer.

* * * * *